US011227299B2

(12) United States Patent
Du et al.

(10) Patent No.: US 11,227,299 B2
(45) Date of Patent: Jan. 18, 2022

(54) AUTOMATIC COMPUTER PRICE TRACKING, VALUATION, AND NEGOTIATION OPTIMIZATION

(71) Applicant: Cvent, Inc., Tysons Corner, VA (US)

(72) Inventors: Dawei Du, Tysons Corner, VA (US); Deborah Mitchell, Tysons Corner, VA (US); Yanchao Feng, Tysons Corner, VA (US); Yuanyuan Guo, Tysons Corner, VA (US); Brian Skarda, Tysons Corner, VA (US)

(73) Assignee: CVENT, INC., Tysons Corner, VA (US)

( * ) Notice: Subject to any disclaimer, the term of this patent is extended or adjusted under 35 U.S.C. 154(b) by 101 days.

(21) Appl. No.: 16/728,241

(22) Filed: Dec. 27, 2019

(65) Prior Publication Data
US 2021/0090107 A1 Mar. 25, 2021

Related U.S. Application Data

(60) Provisional application No. 62/905,755, filed on Sep. 25, 2019, provisional application No. 62/907,305, filed on Sep. 27, 2019.

(51) Int. Cl.
*G06Q 30/02* (2012.01)
*G06Q 50/12* (2012.01)
*G06Q 30/08* (2012.01)

(52) U.S. Cl.
CPC ......... *G06Q 30/0206* (2013.01); *G06Q 30/08* (2013.01); *G06Q 50/12* (2013.01)

(58) Field of Classification Search
CPC ..... G06Q 30/0206; G06Q 30/08; G06Q 50/12
See application file for complete search history.

(56) References Cited

U.S. PATENT DOCUMENTS 8,200,514 B1 * 6/2012 Crean .................... G06Q 10/02
                                                                705/5
8,694,346 B2    4/2014 Crean et al.
(Continued)

FOREIGN PATENT DOCUMENTS

AU    2015200037 A1 *  2/2015  ............. G06Q 10/00
WO    2004088476 A2    10/2004

OTHER PUBLICATIONS

Slava Kisilevich, A GIS-based decision support system for hotel room rate estimation and temporal price prediction: The hotel brokers' context, sciencedirect.com, Jan. 2013, vol. 54, Issue 2, pp. 1119-1133. (Year: 2013).*

(Continued)

*Primary Examiner* — John P Go
*Assistant Examiner* — John G Webster
(74) *Attorney, Agent, or Firm* — Jeffri A. Kaminski; Venable LLP

(57) ABSTRACT

Provided herein are methods, systems, and non-transitory computer-readable media of providing a predicted rate based on information about the property, the customer, and the amenities that a supplier has proposed. The rate may be based on many factors that can be extracted or derived from the historical bid data, including, but not limited to: location and market tier of the property, length of relationship with the channel (which may be an account or customer), the included amenities, the cancellation policy, the size of the account's or channel's event, the season of the booking, the proximity of the channel's offices of the account or channel to the property. Increased confidence that a customer is getting a fair rate facilitates negotiations between contracting parties.

16 Claims, 6 Drawing Sheets

(56) References Cited

U.S. PATENT DOCUMENTS

| | | | |
|---|---|---|---|
| 10,825,084 B1* | 11/2020 | Fitzgerald | G06Q 30/08 |
| 10,956,995 B1* | 3/2021 | Fleischman | G06Q 30/0239 |
| 2005/0004819 A1* | 1/2005 | Etzioni | G06Q 30/0283 |
| | | | 705/5 |
| 2013/0006794 A1* | 1/2013 | Horvitz | G06Q 30/08 |
| | | | 705/26.2 |
| 2013/0339255 A1 | 12/2013 | Taibird et al. | |
| 2014/0089020 A1* | 3/2014 | Murphy | G06Q 10/02 |
| | | | 705/5 |
| 2014/0279163 A1* | 9/2014 | Gladis | G06Q 30/0641 |
| | | | 705/26.3 |
| 2015/0012335 A1 | 1/2015 | Xie et al. | |
| 2015/0161636 A1* | 6/2015 | Williams | G06Q 30/0206 |
| | | | 705/7.35 |
| 2015/0242747 A1 | 8/2015 | Packes et al. | |
| 2018/0342010 A1* | 11/2018 | Hanowell | G06F 16/22 |

OTHER PUBLICATIONS

Cihan Dagli, A Machine Learning Framework for Predicting Purchase by online customers based on Dynamic Pricing, 2014, ScienceDirect, Publication 4, pp. 599-605. (Year: 2014).*

International Search Report and Written Opinion in corresponding International Application No. PCT/US20/52781 dated Feb. 5, 2021 (13 pages).

\* cited by examiner

AUTOMATIC COMPUTER PRICE TRACKING, VALUATION, AND NEGOTIATION OPTIMIZATION

CROSS-REFERENCE TO RELATED APPLICATIONS

This application claims priority benefit to U.S. Provisional Patent Application Nos. 62/905,755, filed Sep. 25, 2019 and 62/907,305, filed Sep. 27, 2019, the contents of which are hereby incorporated by reference in their entireties.

BACKGROUND

1. Technical Field

The present disclosure relates to price tracking, valuation, and negotiation optimization.

2. Introduction

The price of a hospitality product, such as a hotel room or meeting space, may be very subjective and may vary based on variables that are not directly related to the product, supply, or demand. For example, an offer price or an accepted price may be based on unpredictable or inconsistent properties which may undermine the costumer's confidence in proposed or accepted rates. This may cause consumers to be unsure if they are getting a fair price on the space. Thus it may be advantageous to use automated machine learning software to monitor the proposed rate and the final negotiated rate of various spaces based on objective information. Proposed, therefore, is a tool that associates historical pricing points to data points about the negotiation or the property. For example, the desirability of the location, the time of year, the facilities available in the space, the size of the space, the services included, the cancellation policy, information about parties to the negotiation (i.e. their location, net worth, or size), how long the parties have been negotiating, the time of the negotiation, the size of the account, the number of customers that accepted bid in the last period year, or the proximity of the customer's offices to the property. A buyer facing tool may offer users the ability to predict pricing to aid potential buyers in their negotiations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A system, comprising: a data collector configured to collect a historical proposed rate, a historical accepted rate, a historical product characteristic, and a historical customer characteristic; a data cleaner configured to: receive the historical proposed rate, the historical accepted rate, the historical product characteristic, and the historical customer characteristic from the data collector; convert the historical proposed rate and the historical accepted rate to a current currency value; remove outliers from a converted historical proposed rate and a converted historical accepted rate; assign the converted historical proposed rate and the converted historical accepted rate to a clean numeric variable; assign a historical product characteristic and a historical customer characteristic to characteristic variables; generate calculated variables; generate a numerical rate for characteristic variables based on new calculated variables; characteristic variables, and numerical variables; divide the numerical rate into a first data group, a second data group, and a third data group; perform a training on the first data group; perform a validation on the second data group; and perform a testing on the third data group; model builder configured to build a prediction model based on the training, validation, and testing; rate predictor configured to: receive the prediction model; receive inputs from a user about a channel characteristic, a property characteristic, and a season; input the channel characteristic, the property characteristic, and the season into the prediction model; generate a prediction from the prediction model; and output the prediction to the user.

A method comprising: collecting a historical proposed rate, a historical accepted rate, a historical product characteristic, and a historical customer characteristic; converting the historical proposed rate and the historical accepted rate to a cur-rent currency value; removing outliers from a converted historical proposed rate and a converted historical accepted rate; assigning the converted historical proposed rate and the converted historical accepted rate to a clean numeric variable; assigning a historical product characteristic and a historical customer characteristic to characteristic variables; generating calculated variables; generating a numerical rate for characteristic variables based on new calculated variables; characteristic variables, and numerical variables; dividing the numerical rate into a first data group, a second data group, and a third data group; performing a training on the first data group; performing a validation on the second data group; performing a testing on the third data group; building a prediction model based on the training, validation, and testing; receiving the prediction model; receiving inputs from a user about a channel characteristic, a property characteristic, and a season; inputting the channel characteristic, the property characteristic, and the season into the prediction model; generating a prediction from the prediction model; and outputting the prediction to the user.

A computer-readable storage medium configured as disclosed here may store instructions which, when executed by a computing device, causes the computing device to perform a method comprising: determining a property characteristic about a property; assigning the property characteristic a numerical property value using a pricing model; determining a channel characteristic about a channel; assigning the channel characteristic a numerical channel value using the pricing model; determining a negotiation characteristic about a negotiation; assigning the negotiation characteristic a numerical negotiation value using the pricing model; determining a season characteristic about a season; assigning the season characteristic a numerical season value using the pricing model; determining a term characteristic about a term; assigning the term characteristic a numerical term value using the pricing model; receiving a paid price from a user device; assigning the price paid to the property characteristic, the channel characteristic, the negotiation characteristic, the season characteristic, and the term characteristic; removing outliers from the property characteristic, the channel characteristic, the negotiation characteristic, the season characteristic, and the term characteristic; dividing the property characteristic, the channel characteristic, the negotiation characteristic, the season characteristic, and the term characteristic into a first group, a second group, and a third group; performing training on the first group; performing validation on the second group; performing testing on the third group; updating the pricing model based on the training, validation and testing.

DETAILED DESCRIPTION

Figure 1:
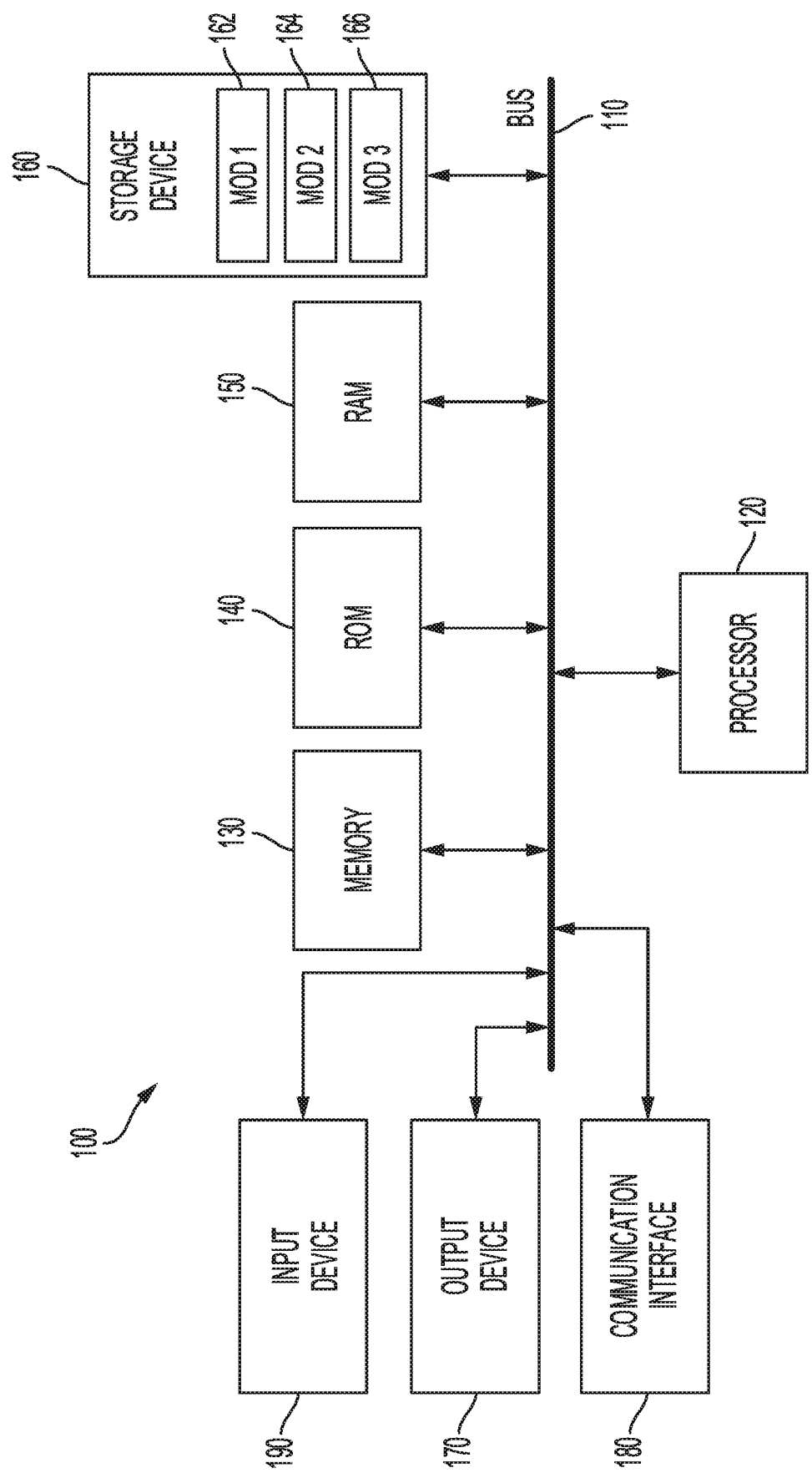
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media of providing a predicted rate based on information about the property, the customer, and the amenities that a supplier has proposed. The rate may be based on many factors that can be extracted or derived from the historical bid data, including, but not limited to: location and market tier of the property, length of relationship with the channel (which may be an account or customer), the included amenities, the cancellation policy, the size of the account's or channel's event, the season of the booking, the proximity of the channel's offices of the account or channel to the property.

An embodiment of the system may build confidence in a corporate community that its members will get a fair rate from the property, which may be a hotel or meeting space, with which they are interacting. Increased customer confidence in their negotiating position may help reduce rounds of negotiation between the customer and the property owner, manager, or negotiating party by giving the customer information about what is typical price for similarly situated customers for the property and desired amenities or services. The typical price may be determined using machine learning model or an algorithm that provides negotiation assistance for demand based on past negotiations with the similar properties (same rate type, room type, tier, location, etc.) for this customer and other customers. Amenities that are considered may include breakfast, parking, fitness area, internet access, shuttle service, business center, etc. The negotiation rates may further take into consideration information about the customer which may impact the desirability of the customer to the property or the property to the customer. The customer information may include whether the customer has an account with the property, the proximity of the customer to the property, or the size of the customer.

The system may comprise a machine learning algorithm to provide pricing based on many different factors including how long customers have been negotiating, the proximity of the customer to the property, the size of the customer, or the net worth of the customer. Those data points may be used to train the algorithm. The outcome of the negotiation may then be used to further train the algorithm. Continuous learning by the algorithm can reduce the error rate of the predictability over time.

In some embodiments, a user may input information about the prospective bid, such as desired season, rate type, room types, and amenities. The user device may inform the user of the price that should be offered, taking into consideration the amenities that should be offered with the rate presented (the algorithm may determine price based on current amenities offered). This can be in the form of a checkbox that is displayed alongside the rates or a graph. If the user wants to see how the price will change when a different set of amenities are selected, the negotiation assistant should update and reflect a new "suggested price" to the user.

Additionally, the program may present the customer an initial recommended rate range which the customer can expect their negotiated rate to fall into. This initial rate range may be established based on any default amenities that may be populated in a bid details from a property profile or the cancellation policy derived from the bid rate plan that the supplier provided. The recommended rate range may change if the corporation alters an amenity or a policy. In other embodiments, an amenity may be added if no pre-population of the amenities occurred because the supplier did not pre-populate its property profile with default amenities. A list of specific fields may be provided that, if changed, may alter the recommended rate range.

There may be logic that dictates when a recommended rate range appears. For example, if there are not enough data points in a particular market to drive a rate range with an acceptable standard deviation (thus making the range of recommended rates too large). In some embodiments, a property that does not have enough data points may be compared with other, similar properties (as well as similar markets, room types, etc.) if the standard deviation is such that the recommended rate range would be too large to offer value in providing a range—for example, if the recommended rate range is between $100-$300, this would not be of value to the customer. Thus inappropriate ranges may be prevented by providing a check of the size of the range based on a comparison of the range size to the median price. Additionally, 'outliers' may be cleaned from the data to prevent bad data from effecting the algorithm.

There may also be logic that would allow interpretation of the result of the recommendation. For example, the customer may get a notification if a property's initial rate was greater than the upper bound of the recommended rate range. The notification may indicate to the customer that the data suggests they should expect a better rate than what is being offered given amenities, policies offered, etc. in the bid rate. Conversely, if the properties initial rate fell below the recommended rate range lower bound, the notification may indicate that the data suggests the customer is getting a good offer given the expected rate range the system calculated. Additionally, there may be logic that compares the price offered with the suggested value. If the price offered is better, than the user may be prompted to choose the offered rate over the suggested rate.

With reference to FIG. 1, an exemplary system includes a general-purpose computing device 100, including a processing unit (CPU or processor) 120 and a system bus 110 that couples various system components including the system memory 130 such as read-only memory (ROM) 140 and random access memory (RAM) 150 to the processor 120. The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, system bus 110, an output device 170 that might be a display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the storage devices 160 that may be a hard disk, other types of computer-readable media which can store data that are accessible by a computer, such as magnetic cassettes, flash memory cards, digital versatile disks, cartridges, random access memories (RAMs) 150, and read-only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Figure 2:
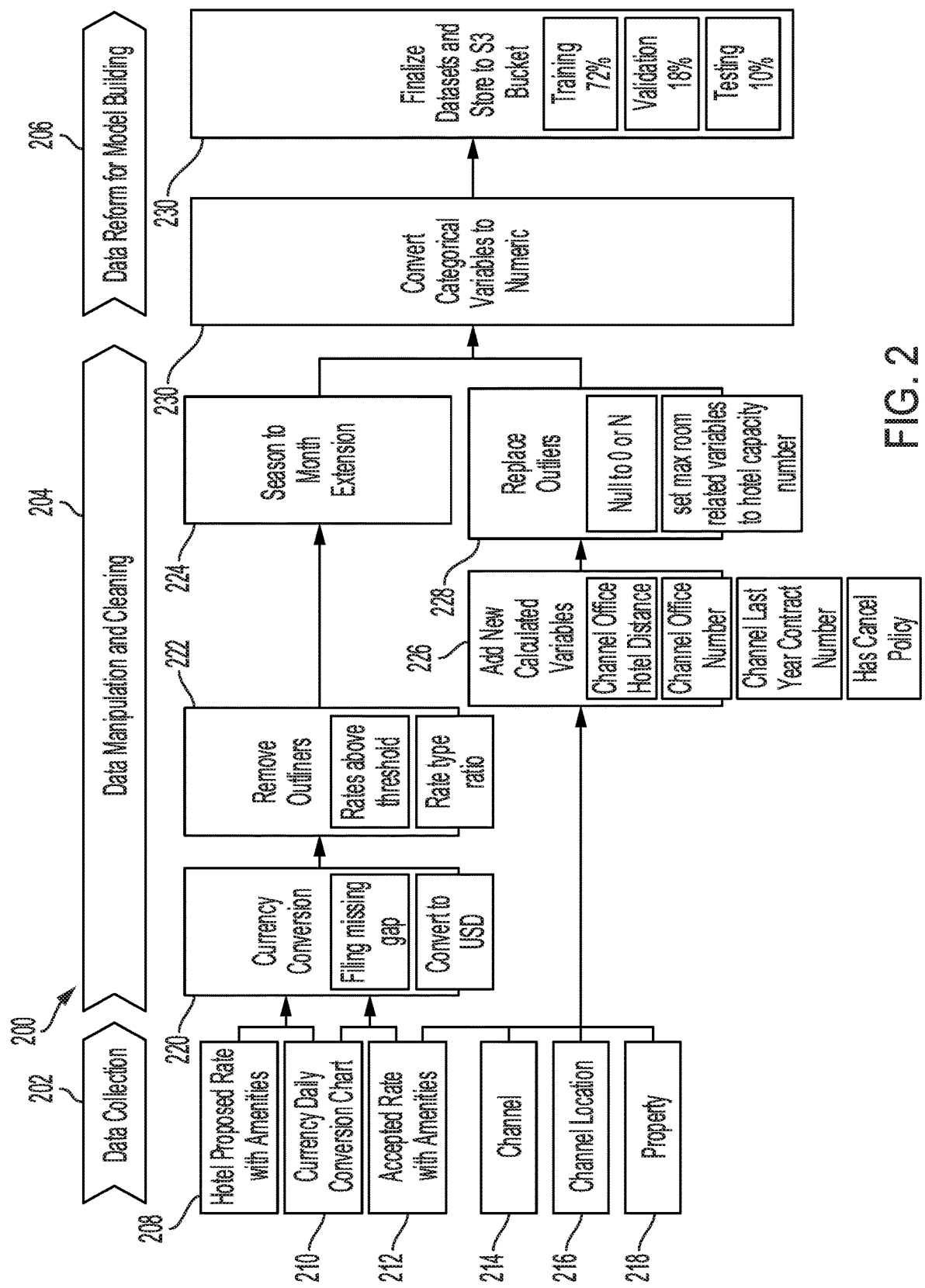
FIG. 2 illustrates an example embodiment arrangement.

FIG. 2 is a block diagram of an exemplary embodiment. The system may be divided into three stages, a data collection stage 202, a data manipulation and cleaning stage 204, and a data reform for model building stage 206. The data collection stage 202 may collect data including the proposed rate for the property 208—which may be a hotel, a currency daily conversion chart 210, and an accepted rate 212 may include any amenities. The proposed rate for the property 208 a currency daily conversion chart 210, and an accepted rate 212 may be provided for currency conversion 220 which may occur in the data manipulation and cleaning stage 204. The conversion of the proposed rate and accepted rate 212 may be converted into the corresponding rate at the time at 220. The conversion may be for inflation or for the type of currency, for example, it may be converted from Euros to US dollars. At 222 the converted proposed rate for the property 208, and the converted accepted rate 212 may cleaned to remove outliers. The outliers may be a number of data points that are the highest and the lowest. In other embodiments the outliers may be data points that deviate an amount from the other data points, for example, outside of a standard deviation. At 224, the remaining converted proposed rate for the property 208, and the converted accepted rate 212 may be assigned to the season of the event, this may be divided by days, weeks, months, or seasons.

The data collection stage 202 may further include a channel 214, a channel location 216, and a property 218. The channel 214 may be a company, person, or organization that may be sponsoring, hosting, or organizing the event. The channel location 216 may be geographical location where the channel is located or head quartered. The property 218 may be the place where the channel is seeking to host the event. The property 218 may include a number of variables specific to the property that may be represented by a numeric value. The channel 214, a channel location 216, a property 218, and the accepted rate 212 may be provided to 226 where calculated variables may be added. The calculated variables may include the distance between the channel's office and the property, the number of offices the channel has, if the channel has a contract that applies to the booking, whether there is a cancellation fee or include the terms of the fee. At 228 the outliers may be removed from the data points using methods described herein. In some embodiments, the room related variables relating to capacity or occupancy may be set to conform to the property's capacity or occupancy at 228.

The data reform for model building stage 206 may being at 230. At 230 the remaining variables may be received and may be assigned a numerical value. For example, if the property 218 has a characteristic stating that the property is four-star, the star value may be set to 100. If the property 218 has a characteristic stating that the property is two-star, the star value may be set to 50. The categorical values may be any value that is not defined as a number value. For example, the accepted rate 212 may not be considered to be a categorical value and the market may be a categorical value. The final datasets may be sent to 232 and stored in a data bucket that may be identified as S3. The data sets may be used to train a machine learning algorithm. In an embodiment, a portion of the data may be used for training that algorithm, which may use the data to make correlations between the different categories, for example, a price associated with a particular channel. A portion of the data may be used for validation, this may determine how accurately the algorithm performs and may create a standard deviation or error range. Another portion of the data may be used for testing to ensure that the algorithm predictions are within the standard deviation. In some embodiments, the training may be performed on 72% of the data. The validation may be performed on 18% of the data. And the testing may be performed on the remaining 10% of the data.

Figure 3:
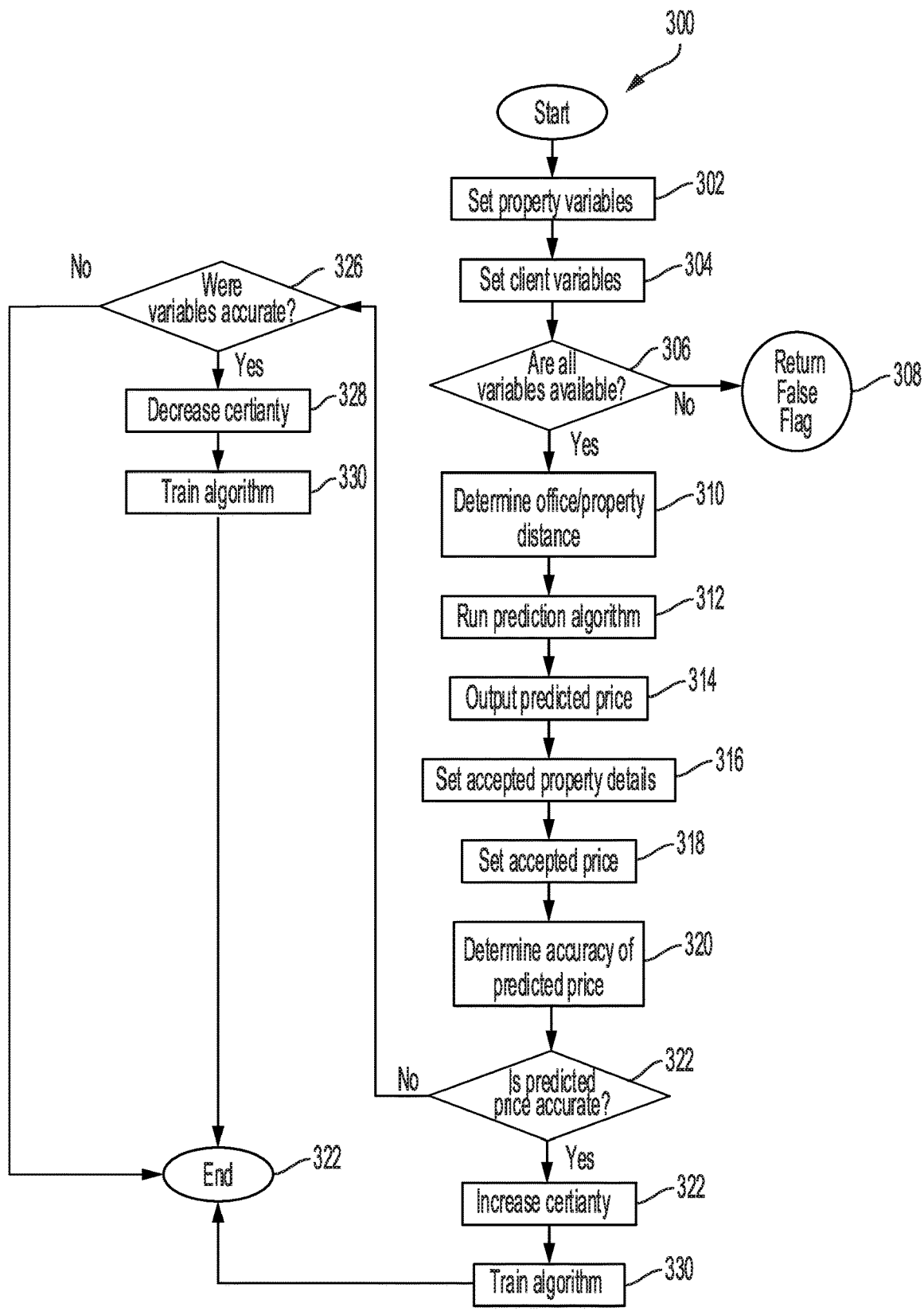
FIG. 3 is an example method.

FIG. 3 is an embodiment of a method 300 that may be employed when a request for a prediction is provided by a user. At 302, property variables may be set. The property variables may include information about the property that is the subject of the negotiation. For example, the variables may include whether there are amenities, such as breakfast included, a fitness center, free parking, transportation to the airport, a business center, wireless internet, etc. The variables may further include information about property, for example, room size, bed type, star rating, location, cancellation policy, etc. The variables may hold strings, vectors, Boolean objects, or numeric values. Information about the channel which may be the client or customer, may assigned to variables 304. These variables may include the desirability of the property to the client or the client to the property, for example, if the property has a corporate relationship with the client, or whether the client is large and could generate additional business. The client variables may also indicate the bargaining power of the client. The variable values may be input by a user or may be automatically set based on information known or obtained by the system. At 306, it may be determined if any of the variables of 302 and 304 were not available and/or not set. If any of the variables are not set, equal to zero, or are empty a false flag may be returned at 308. At 310 the distance between a corporate office of the channel or client and the location of the property may be determined. This may be based on the geographical coordinates of the corporate office and the property.

The set variables may be input into the prediction algorithm at 312 and the predicted price may be output at 314 based on the variables. This prediction may include a range with an upper or lower bound or a median value as well as the prediction value. At 316 the algorithm may request data from the user, this may include the final details and amenities agreed to by the customer and supplier in the final agreement. At 318 the final accepted price may be entered. Steps 316 and 318 may occur in the same session as the previous steps or the information may be obtained later after the final agreement is reached. The method may prompt the user to enter this information at a later time. At 320 the accuracy of the initial prediction may be determined based on the information input at 316 and 318. In some embodiments a value may be given indicating how accurate the prediction was. In other embodiments, the prediction may be deemed accurate or inaccurate based on whether the prediction was within a margin of error or standard deviation.

The accuracy of the prediction may be determined at 320. If the prediction is found to be accurate at 322, the certainty of the prediction model may be increased at 322 and the prediction model algorithm may be trained using the information from the accepted price and terms. In other embodiments, an accuracy marker may be set to a first value. If the prediction is not determined accurate at 322, the method may determine at 324 whether the prediction was made using the correct variables by comparing the final variables to the variables input at 302 and 304. If the variables were incorrect, the method may end at 322. In other embodiments, an accuracy value may be set to a second value. If the variables were accurate, the certainty of the model may be decreased at 328. In other embodiments, an accuracy marker may be set to a third value. At 330 the accepted rate and variables may be used to train the algorithm at 330.

Figure 4:
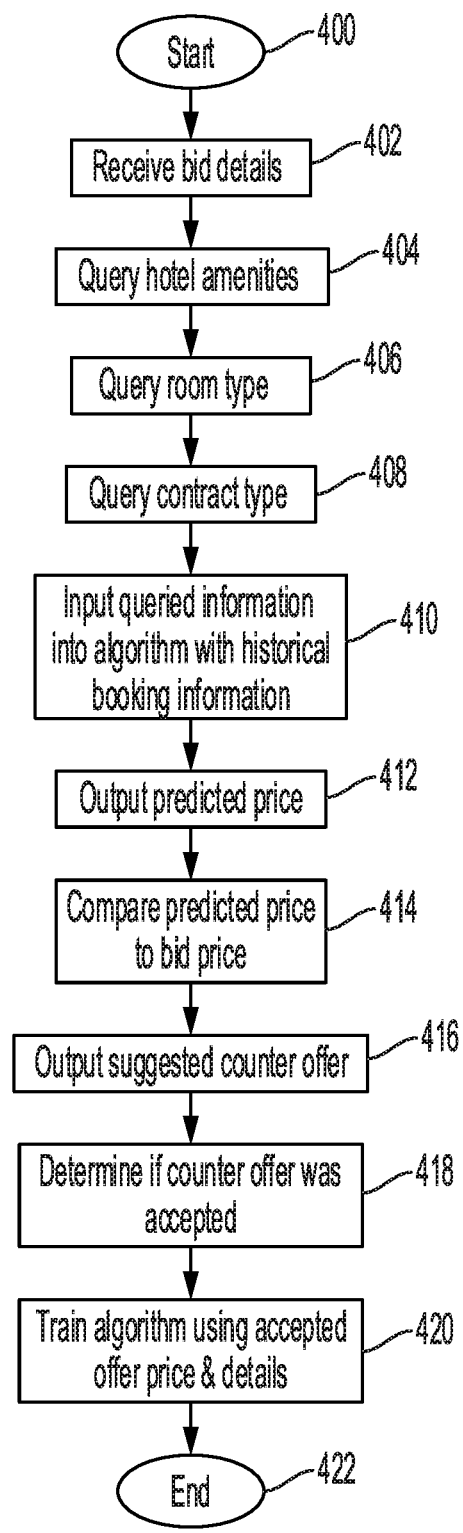
FIG. 4 is an example method.

FIG. 4 is an embodiment of method that begins at 400 and is performed on a computing environment using a software program designed to perform the method. At 402 the program may receive details which may include the offered price. The bid may be generated by a third-party such as hotel, event space, or event planning company. The bid may be received in response to an inquiry made by a client or customer and may be made through the software program. The inquiry may include details such as the desired amenities, the type or number of rooms desired, the desired location, the date and length of stay, the desired hotel, etc. The bid or bids received at 402 may meet all or some of the details requested in the inquiry. At 404, the program may query the details of the bid, such as the hotel amenities. At 406 the program may query the type of room that is included in the bid. At 408 the program may query the terms of the bid, such as the length of stay or use of the hotel or property, the date of the use or stay or whether there is a cancellation policy.

At 410, the information a about the bid may be compared to historical information that has been compiled about similar agreements that have been reached. At 412, the information queried about the bid may be used to generate a predicted rate for similar rentals or agreements. A confidence rate may be determined for a prediction and this may be provided to the user with the prediction. In other embodiments, the prediction may be flagged if the confidence level is below a threshold. At 414 the predicted rate may be compared to the bid rate. The difference in the predicted rate and the bid rate may be used at 416 to determine a suggested counter offer that may be output to the user. The software program may offer a prompt to submit the suggested counter offer or to the original offeree. In other embodiments the user may manually submit or communicate the suggested offer or counter offer. The counter offer may include the price, amenities, room type, or any other terms of the agreement. In other embodiments, one or more of the terms of the agreements may be set as non-negotiable by the user and the other terms of the agreement may be altered to form an appropriate counter offer. For example, the user may set the price as non-negotiable and the counter offer may suggest a smaller room for that price point. In other embodiments, the user may input a counter offer and the prediction generator may determine the probability of the offer being accepted. In still further embodiments, the user may edit desired amenities to generate new bids and/or predictions. At 418 the software may determine if the counter offer was accepted. Acceptance or denial of the counter offer may be automatic or determined by communicating via the software or it may be input by the user. In some embodiments, the counter offer and acceptance may happen later or in a different user session. In further embodiments, the software may prompt the user to input the counter offer that was made and whether it was accepted. The software may also receive information about the final contract, amenities, room type, or other information about the final negotiated agreement. At 420, the information input about the accepted agreement may be used to train the prediction algorithm. The method may end at 422.

Figure 5:
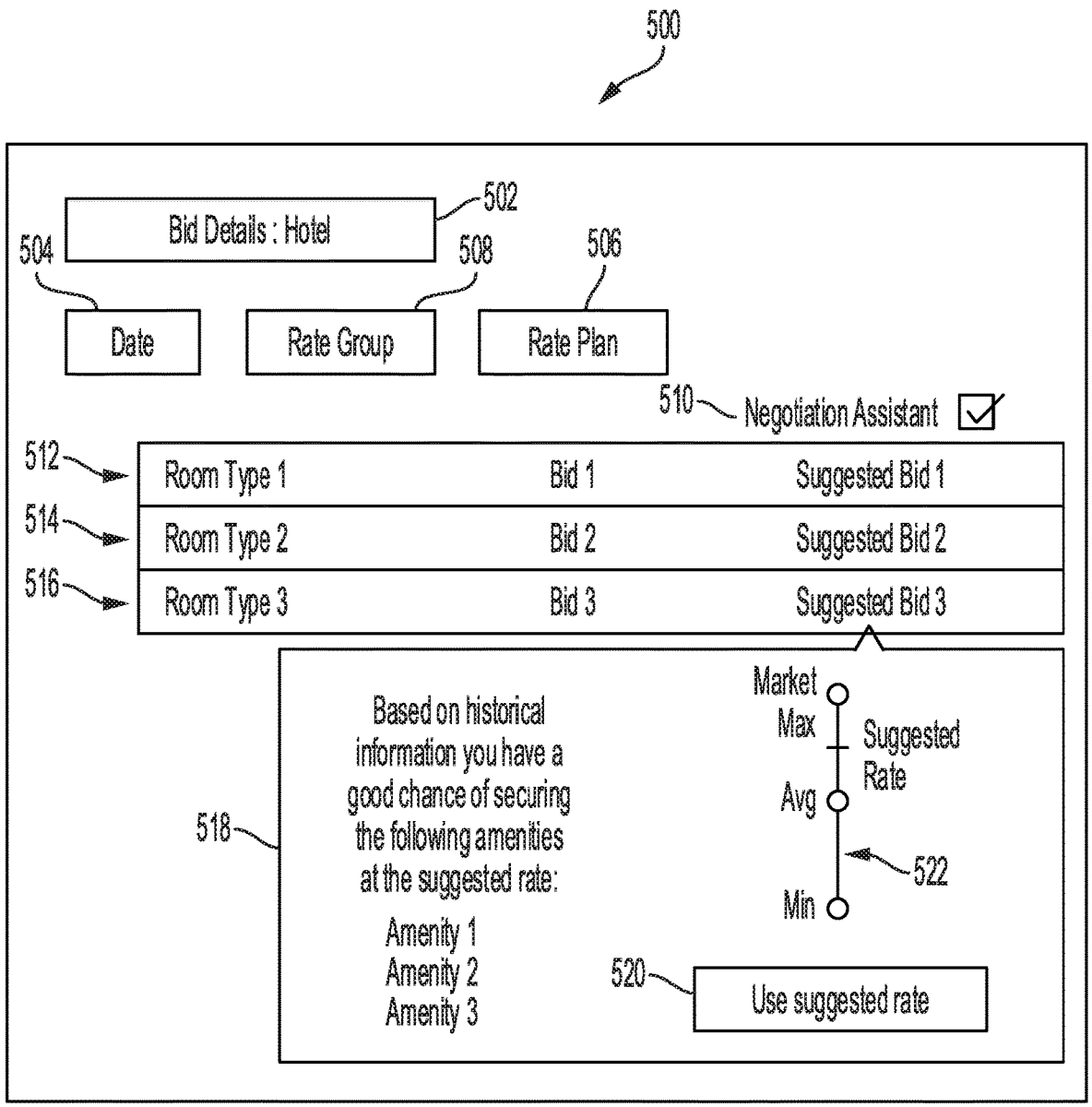
FIG. 5 is an example user interface.

FIG. 5 depicts an example user interface 500 for an embodiment of the invention. Bid details, such as the hotel of property name, may be displayed at 502. At 504 the date of the potential reservation may be displayed at 504. The rate group may be displayed at 508. The rate group may identify the type of rate that the customer receives. For example, the customer may be a member of a rewards program or the customer may be a corporation that has an applicable corporate discount. The rate group 508 may identify the group that the customer belongs to and the rate plan 506 may identify the type of plan that members of the group is entitled to. A selectable box may be displayed at 510, this may allow a user to determine whether to activate a program to generate offer suggestions and evaluate the bid based on historical data as discussed herein. Various bid details may be displayed at 512, 514, and 516. The room type and price may be displayed, for example. If the Negotiation Assistant option is selected, 512, 514, and 516 may further display a suggested counter offer that may be generated using the methods and systems described herein. Selecting or hovering over the bid may cause window 518 to pop-up. The window 518 may indicate a range of rates that have been secured for the room type at that property. This may further be based on the season or time that the room is being reserved. The suggested rate within that range may further be displayed. The suggested rate may be determined based on any of the historical factors described herein. Additionally, the amenities that may be available at that rate may be displayed. This may also be based on historical variables. Pop-up window 518 may have selectable option 520 that, if selected, may cause the suggested bid to be sent to the party offering the property.

Figure 6:
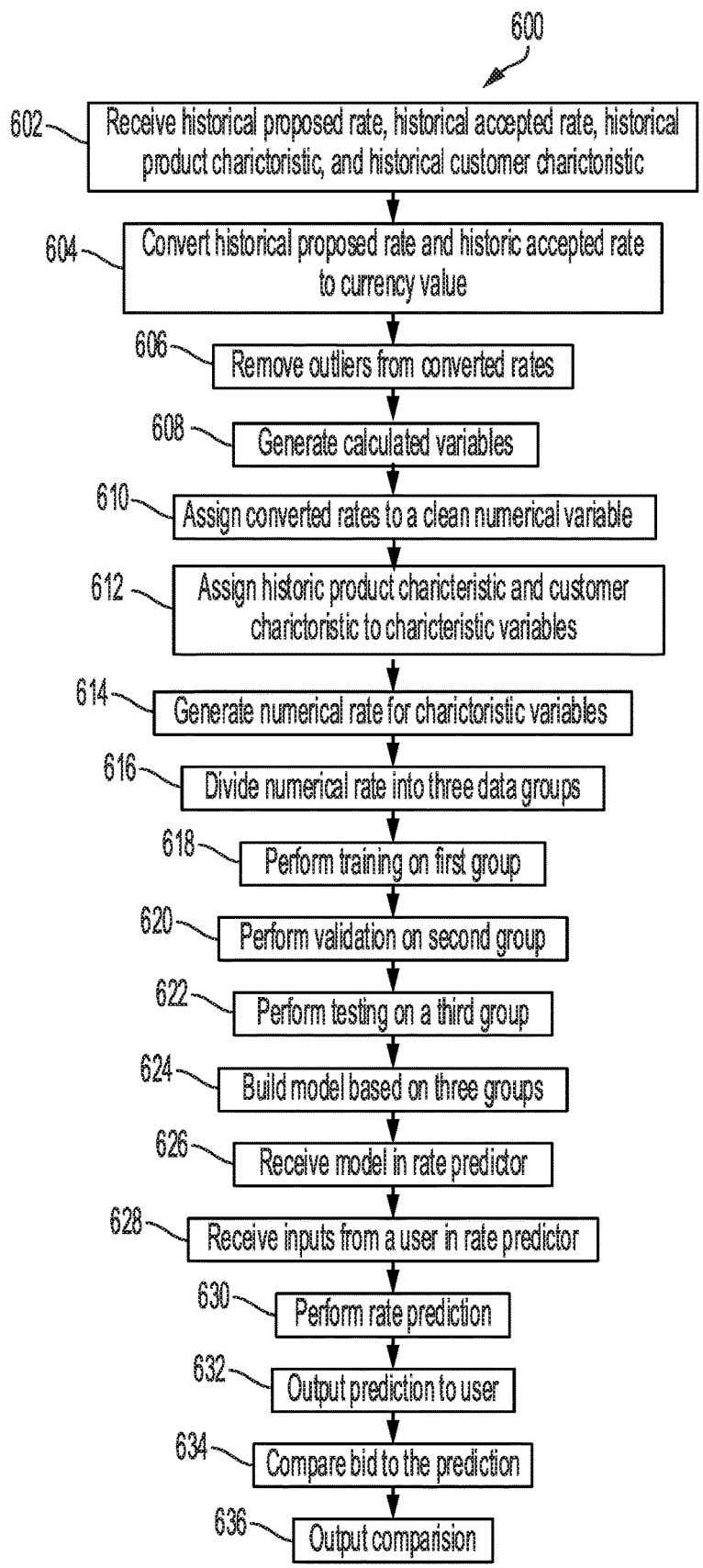
FIG. 6 is an example method.

FIG. 6 depicts method 600 that may be employed by a software program for performing embodiments of the method described herein. At 602, the program may receive historical information about agreements for booking various hospitality spaces, such as hotel rooms. The historical information may include historically proposed rates, historically accepted rates, historical product characteristics, such as room type, property or hotel, amenities, star rating, location, etc., and historical customer characteristics. The customer characteristics may include the specific customer, the size of the customer, the relationship between the customer and the company providing the bid, whether the customer is an individual or corporation, etc. At 604 the historical proposed rate and the historical accepted rate may be given a currency value. The currency value may be determined based to the type of currency or the inflation rate since the time of the historical proposed and accepted rate. At 606 historical outliers may be removed from the data, this may create a more accurate data set. The outliers may be determined based on the room type. At 608 additional variables may be calculated. For example, the distance between the customer office and the property may be determined, the rate at which proposed rates are accepted from the customer, whether there is a cancellation policy, the difference between the amenities in the proposed bid and the excepted bid, etc. The variables may then be cleaned at 610. The clean numerical value may be assigned based on the characteristics, for example, some variable, such as amenities may be changed into Boolean format. Numerical variables may be rounded to set size or changed into a range. At 612 historic product characteristic and customer characteristic variables transformed into a consistent format. At 614 the historic customer characteristics and product characteristics are assigned a numerical value. For example, if one of the historic product characteristics is month, the month may be converted to a numerical value based on demand during the relevant month. This may be done using a LabelEncoder application.

At 616, the cleaned and transformed data may be divided into three data groups. The break down of the data groups may be 72% for training, 18% for validation, and 10% for testing in some embodiments. At 618 the training data may be used to train a model using any of the machine learning training methods known in the art, such as using a xgboost model. At 620, the validation may be performed on the dataset using the any of the methods known in the art, for example, using a Mean Absolute Error metric. The model may then be tested on the remaining data at 622. The final model may then be selected and built at 624. The generated model may then be received in the rate predictor module at 626. In some embodiments, the validation and testing results may be used to provide a confidence level of the model's predictions.

The rate predictor may then be accessed by a user at 628. The user may input information about the request, such as the parameters of the event or rental desired by the user, customer information, the desired location, etc. The information input by the user may used to perform the rate prediction at 630. In some embodiments, the user may receive bids and the rate prediction may be performed using information specific to the bid that may not be specified by the user. The prediction may then be provided to the user at 632. The prediction may then be compared to one or more bids at 634. The comparison may be output to the user at 636. The comparison may include additional information such as amenities that may be expected or included at a given bid price. The model may continue to be updated as additional data is received.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A system, comprising:
    a data collector configured to collect a historical proposed rate, a historical accepted rate, a historical product characteristic, and a historical customer characteristic;
    a data cleaner configured to:
        receive the historical proposed rate, the historical accepted rate, the historical product characteristic, and the historical customer characteristic from the data collector;
        convert the historical proposed rate and the historical accepted rate to a current currency value;

remove outliers from a converted historical proposed rate and a converted historical accepted rate;

assign the converted historical proposed rate and the converted historical accepted rate to a clean numeric variable;

assign a historical product characteristic and a historical customer characteristic to characteristic variables;

generate calculated variables;

generate a numerical rate for characteristic variables based on new calculated variables; characteristic variables, and numerical variables;

divide the numerical rate into a first data group, a second data group, and a third data group;

training a machine learning algorithm using the first data group;

validating the machine learning algorithm using the second data group; and testing the machine learning algorithm using the third data group;

a model builder configured to build a prediction model using the machine learning algorithm based on the training, validation, and testing; and a rate predictor configured to:
receive the prediction model;
receive inputs from a user about a channel characteristic, a property characteristic, and a season;
input the channel characteristic, the property characteristic, and the season into the prediction model;
generate a prediction from the prediction model; and
output the prediction to the user, wherein an accuracy of the prediction is used to retrain the machine learning algorithm.

2. The system of claim 1, further comprising a negotiation assistant that receives a bid rate from a third-party.

3. The system of claim 2, wherein the negotiation assistant compares the bid rate to the prediction.

4. The system of claim 3, wherein the negotiation assistant outputs a suggested counter offer if the bid rate is greater than the prediction.

5. The system of claim 3, wherein the negotiation assistant provides a probability of acceptance based on a proposed rate provided by the user.

6. The system of claim 1, wherein an accepted rate is input into the data collector by a user.

7. The system of claim 1, wherein an accepted rate is used to determine the historical accepted rate.

8. The system of claim 1, wherein the historical product characteristic is a hotel amenity.

9. The system of claim 1, wherein the historical product characteristic is a room type.

10. A method comprising:
collecting a historical proposed rate, a historical accepted rate, a historical product characteristic, and a historical customer characteristic;
converting the historical proposed rate and the historical accepted rate to a current currency value;
removing outliers from a converted historical proposed rate and a converted historical accepted rate;
assigning the converted historical proposed rate and the converted historical accepted rate to a clean numeric variable;
assigning the historical product characteristic and a historical customer characteristic to characteristic variables;
generating calculated variables;
generating a numerical rate for characteristic variables based on new calculated variables; characteristic variables, and numerical variables;
dividing the numerical rate into a first data group, a second data group, and a third data group;
training a machine learning algorithm using the first data group;
validating the machine learning algorithm using the second data group;
testing the machine learning algorithm using the third data group;
building a prediction model using the machine learning algorithm based on the training, validation, and testing;
receiving the prediction model;
receiving inputs from a user about a channel characteristic, a property characteristic, and a season;
inputting the channel characteristic, the property characteristic, and the season into the prediction model;
generating a prediction from the prediction model; and
outputting the prediction to the user, wherein an accuracy of the prediction is used to retrain the machine learning algorithm.

11. The method of claim 10, wherein the prediction is a range of rates.

12. The method of claim 10, further comprising:
receiving edited characteristic values; and
generating a second prediction from the prediction model.

13. The method of claim 10, further comprising:
generating a confidence metric based on the validating of the machine learning algorithm using the second data group.

14. The method of claim 13, further comprising:
providing the confidence metric to the user with the prediction.

15. The method of claim 13, further comprising:
providing a warning to the user when the confidence metric is below a threshold.

16. The method of claim 10, further comprising:
receiving an accepted rate from the user;
updating at least one of the first data group, the second data group, or the third data group based on the accepted rate, the channel characteristic, the property characteristic, and the season.

* * * * *